Jan. 14, 1964  A. S. C. WADSWORTH ETAL  3,117,824
ACCESSORY TRACTION UNITS
Original Filed March 22, 1961  2 Sheets-Sheet 1

ALEXANDER S. C. WADSWORTH
FRANCIS B. PEACOCK
*INVENTORS*

BY *W. Glenn Jones*
*attorney*

ALEXANDER S. C. WADSWORTH
FRANCIS B. PEACOCK
*INVENTORS*

United States Patent Office 3,117,824
Patented Jan. 14, 1964

1

3,117,824
ACCESSORY TRACTION UNITS
Alexander S. C. Wadsworth, 728 S. Waynes St., Arlington 4, Va., and Francis B. Peacock, 6115 Castelton Drive, San Diego 17, Calif.
Original application Mar. 22, 1961, Ser. No. 97,707, now Patent No. 3,058,783, dated Oct. 16, 1962. Divided and this application May 1, 1962, Ser. No. 191,655
6 Claims. (Cl. 305—51)
(Granted under Title 35, U.S. Code (1952), sec. 266)

The invention described herein may be manufactured and used by or for the Government of the United States of America for governmental purposes without the payment of any royalties thereon or therefor.

This invention relates generally to improvements in quickly attachable-detachable traction units which are adapted for use in connection with the endless tracks of certain types of tractors. The invention is particularly addressed to modified forms of street plates which may be rapidly installed on or removed from the standard track or grouser plates making up the endless track as supplied with the tractor.

This application is filed as a divisional application in response to a requirement for restriction in our prior filed copending application, Serial No. 97,707, filed March 22, 1961, now Patent No. 3,058,783, dated October 16, 1962. This application will disclose and claim species of our invention disclosed in FIGURES 4, 5, 6, 7, and 8 of the parent application as heretofore identified. The figures of the present application, identical with the figures of the parent case listed above, are renumbered as FIGURES 2, 3, 4, 5, and 6.

The usual endless tracks supplied with such tractors comprise a plurality of grouser or track plates secured to one or more heavy link, endless sprocket chains which turn on power driven sprocket wheels at each end of the machine. The grouser consists of a fairly flat plate with an outwardly extending cleat or lug usually formed integrally with the plate portion. When the tractor is run over pavement, flooring, or particularly stony ground, it is customary to place a street plate or other protective device on each grouser so as to prevent the grouser cleat or lug from digging into the pavement or flooring and also to prevent the cleat from being damaged by the stony ground. Ordinarily these street plates or other protective devices are bolted to each of the grousers and, as can be readily seen in large tractors, such an operation is time-consuming, tedious and arduous. Where the tractor is to be moved only a short distance over pavement, flooring or rough ground, such an operation becomes expensive and annoying. Where dunnage is used to provide an auxiliary pavement or track over which the grouser-cleated tractor moves, the procurement and emplacing of the dunnage, and its consequent removal, are also inconvenient, time-consuming, and expensive. With our invention, however, the emplacement and removal of street plates or other protective devices becomes but a matter of minutes resulting in a material saving in time and labor charges.

In such fittings shown in the prior art, which fittings relied on mechanical connection to the grouser, either some modification had to be applied to the grouser for adapting it to the use of such fittings or the grouser had to be carefully cleaned on both sides to install such fittings.

The principal object of our invention is to provide quickly attachable-detachable traction units which may enable a rapid conversion of one form of tractor to another thus saving time, labor and capital expenditure for a considerable number of special purpose tractors.

Further objects and advantages of our invention will be appreciated and understood in view of the following detailed description and accompanying drawings wherein.

Figure 1:
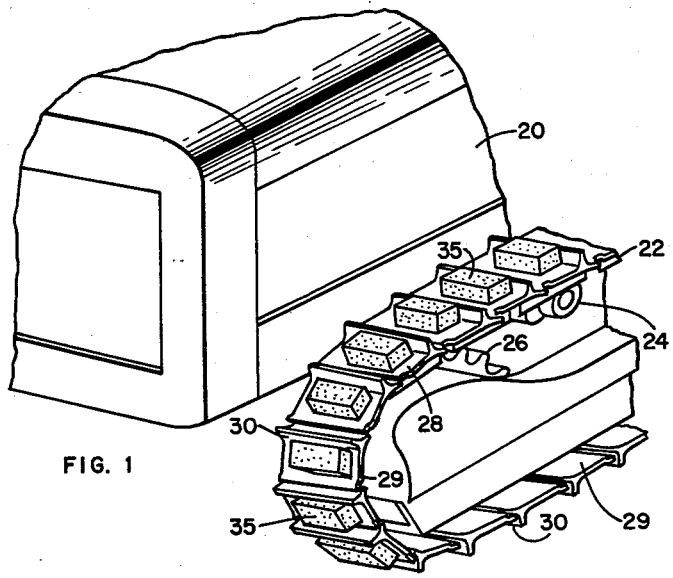
FIGURE 1 is a partial view in perspective of a tractor with part of an endless track.

With reference to FIGURE 1, the body of the tractor is indicated by the character 20. Endless track 22 is supported on rollers 24 and is caused to move in either a forward propelling direction or in reverse thereof by sprocket wheel 26. The endless track 22 comprises a heavy link belt or chain (not shown) to which the usual grousers 28 are pivotally and relatively permanently attached. As shown, these grousers 28 are formed with a relatively flat planar plate 29 extending in the general plane of the track and a cleat or lug portion 30 extending outwardly therefrom. As also shown, the leading end of each grouser may be formed to overlap the trailing edge of the grouser ahead of it so as to present a fairly unbroken surface when the track is passing over the sprocket wheel. Usually, these grousers are cast or forged into shape shown so that cleat 30 is integrally formed with the flat plate 29.

As illustrated in FIGS. 2-6, inclusive, these grousers are supplied with a transverse row of bolt holes 32 punched or drilled in the flat plate portion 29. Usually, only two holes are supplied, but more many be furnished, depending on the width of the grouser. These holes are utilized for the purpose of bolting on the various street plates, extra cleats, or other traction units. Reinforcements 33 for the holes 32 may be welded or otherwise suitably secured to the bottom surfaces of the grouser plate portions 29 where and as needed. As will be more fully described, these bolt holes 32 will be utilized in our invention.

Figure 2:
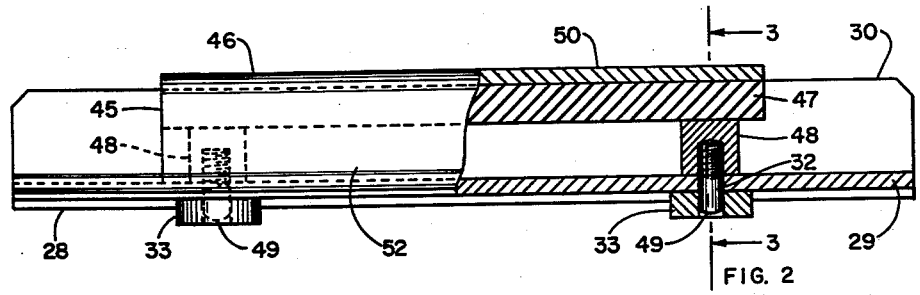
FIG. 2 is a side elevation, partly in cross section of one form of street plate as installed on the grouser.
Figure 3:
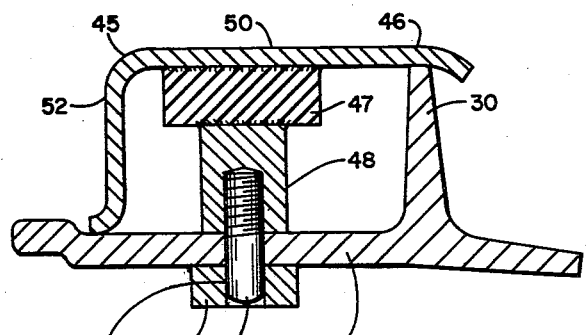
FIG. 3 is a cross sectioned end view thereof taken on the line 3—3 of FIG. 2.

As shown in FIGS. 2 and 3, the formed street plate 45 comprises the curved steel plate 46, a strip of elastic material 47, a pair of permanent magnets 48 and their associated pins or studs 49. This street plate is shown installed on a grouser 28 with its flat plate portion 29, bolt holes 32, reinforcements 33, and outwardly extending cleat portion 30.

Curved steel plate 46 is formed with a flat generally horizontal portion 50 and a vertical or downwardly depending portion 52. Horizontal portion 50 rests on top of the grouser cleat portion 30 and may be slightly downwardly curved, as shown, to retain it in place with relation to the grouser. Vertical portion 52 rests on the upper surface of grouser plate portion 29. The bottom of this vertical portion may be bent, as shown, to prevent cutting into the surface of the plate portion 29 and also to locate the curved plate 46 with relation to the bent portion in the grouser plate portion 29.

The strip of elastic material 47, which may be of hard rubber, felt, plastic, plastic impregnated substances, rubber substitutes, synthetics, or even wood, is vulcanized or otherwise suitably adhesively secured to the underside of plate 46. Depending from this strip 47 are the permanent magnets 48 and pins 49. These permanent magnets 48 may be of any desired shape, cylindrical, square, or rectangular, but should be of high quality material having a maximum magnetic force per unit volume of material. The magnets 48 may be formed with a threaded aperture to accept the threaded steel pins 49. While other modes of securing the pins 49 into the magnets 48 could be accomplished, some of them might be more difficult of accomplishment due to the nature of the magnetic material used in the magnets. Generally, these maximum strength magnets are made from brittle refractory-like substances sintered and pressed to shape. Such construction does not have too much shear strength and could easily be ruptured by attempting to force a smooth stud or pin into a molded or formed hole therein. Thus, the function of the elastic strip 47 is not only to support the magnets 48 from the plate 46 but to cushion the comparatively frail and brittle magnets against the compressive forces developed by the flexure of the horizontal portion 50 of the curved steel plate 46. The magnetic forces developed from the magnets through the grouser plate and cleat portions and the street plate curved portion 46 serve to hold the street plate in place against the centrifugal forces developed by the track going around the sprocket wheels while the shear and compressive forces are resisted by the grouser and the curved steel plate portion of the street plate.

While the magnets 48 have been shown, it is to be understood that more magnets could be used where more holes are available in the grouser plate or one long magnet could be used with a plurality of pins protruding downwardly therefrom.

In use, the grouser plate is washed off with a hose, if necessary, the area around the holes in the top surface of the grouser is lightly wire brushed to effect a reasonably good contact between the grouser plate and the magnetic faces, and the street shoe is placed thereon with the pins 49 protruding through the grouser plate holes 32 and reinforcements 33. The magnetic lines of force spread outwardly in all directions and tend to become concentrated in the grouser plate and the street plate 45. Removal is accomplished by pulling or prying the sheet plate upwardly until the pins are disengaged from the bolt holes in the grouser.

Figure 4:
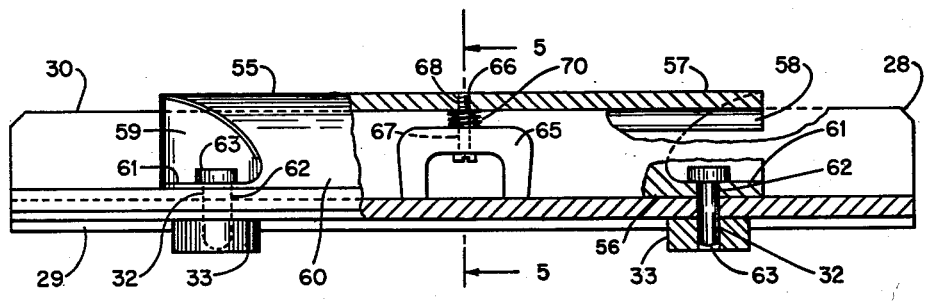
FIG. 4 is a partly broken away, partly sectioned, side elevation of a modified street plate.
Figure 5:
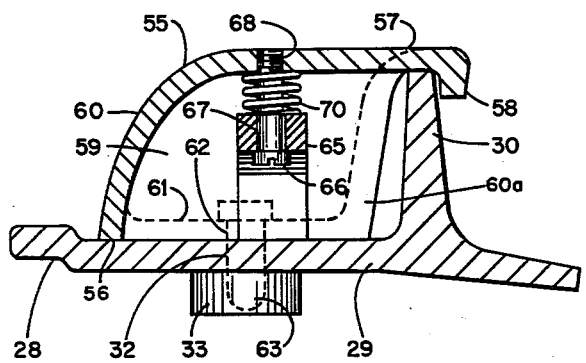
FIG. 5 is a cross section end view of the modified street plate taken on the line 5—5 of FIG. 4.
Figure 6:
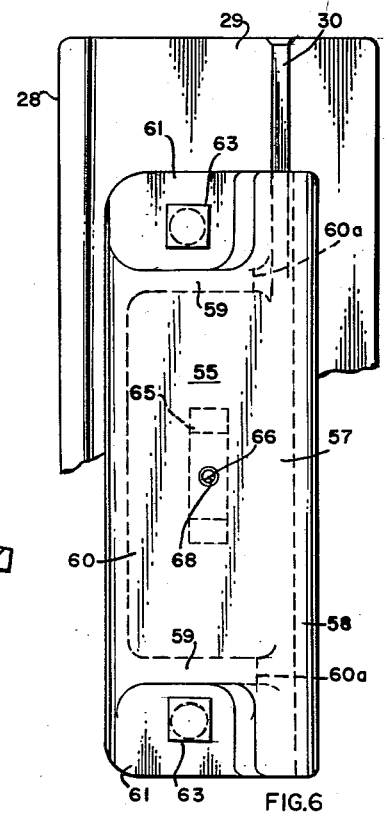
FIG. 6 is a plan view of the modified street plate shown in FIGS. 4 and 5.

While the embodiment described above is a new article of manufacture, being a specially designed street plate, that shown in FIGS. 4, 5, and 6 is a modification applied to a standard, commercially supplied, street plate 55. This standard street plate is a generally hollow body extending upwardly from a generally planar base 56. This plate may be forged or cast from steel or other high strength ferrous materials. These plates have a horizontal portion 57, downwardly depending curved sides 59, and downwardly depending substantially vertical back and front walls 60 and 60a, and base portion 61 having holes 62 for the reception of headed pins 63.

It will be noted that horizontal portion 57 terminates in a hook portion 58 which hooks over the upper edge of the grouser cleat 30. This arrangement, of course, keeps the street plate located with reference to the cleat and serves to protect the cleat from damage. The sides 59 curve inwardly toward the back 60 to make room for the holes 62 in the base portions 61.

The modification made by us is to supply the horseshoe magnet 65 which is suspended from the horizontal portion 57 of the standard street plate 55 so as to contact the grouser plate portion 29. The suspension is accomplished by headed screw 66 which passes through a hole 67 formed in the yoke of the horseshoe magnet and threadedly engages a threaded hole 68 in the street plate horizontal portion 57. A compression spring 70, surrounding screw 66, is interposed between the undersurface of the horizontal portion 57 and the yoke of the magnet. Obviously, the function of this spring is to take most of the compressive forces developed in the street plate 55 and thus protect the comparatively frail magnet.

The magnetic forces developed by the horseshoe magnet throughout the sides and other portions of the steel street plate and the grouser serve to hold the plate in place against centrifugal forces as previously described. Pins 63, which may be force fitted into street plate holes 62 take the shear stresses developed. The use and installation of this modification is, obviously, similar to that described in connection with the other forms shown above.

Having thus described certain preferred embodiments of our invention, we do not intend to be limited thereby as many modifications thereof may suggest themselves to those skilled in the art. It is intended that all such modifications shall be considered as falling within the spirit of our invention and the scope of the appended claims wherein we claim:

1. Accessory traction units for use with the endless tracks of a tractor where said endless tracks consist of a plurality of segmented track plates of paramagnetic materials having a flat planar portion, a cleat portion extending normally outwardly from said planar portion, and a transverse row of bolt holes formed therein, each traction unit comprising:

a generally raised body portion extending upwardly from the flat planar portion of said track plate, said body portion having an outer roadway surface contacting area adapted to extend beyond the outer edge of said cleat portion;

a plurality of pins secured to said traction unit and depending downwardly therefrom, said pins being adapted to fit into said bolt holes in said track plates;

magnetic fastening means secured within said body portion, said magnetic means having planar portions directly in contact with the planar portion of said track plate; and resilient protective means provided between said outer surface contacting area and said magnetic fastening means for protecting said magnetic fastening means from the compressive forces acting from the outer surface contacting area of said traction unit inwardly to the planar portion of said track plate.

2. A street plate for use with the endless tracks of a tractor where said endless tracks consist of a plurality of segmented track plates of paramagnetic materials, each of said track plates having a flat planar portion, a cleat portion extending normally outwardly from said planar portion for contacting the surface over which said tractor is being traversed, and a transverse row of bolt holes formed in said planar portion, each street plate comprising:

a curved plate of paramagnetic materials having a substantially horizontal planar portion and a downwardly extending generally vertical leg portion, the under surface of said planar portion resting on the outward edge of said track plate cleat and the bottom of said vertical leg resting on the outer surface of said track plate planar portion;

a rectangular block of resilient material secured to the under surface of said curved plate planar portion;

magnetic fastening means secured to the bottom surface of said resilient block for contacting the upper surface of said track plate planar portion; and a plurality of studs depending downwardly from and secured to said magnetic means for insertion into said track plate bolt holes.

3. A street plate as claimed in claim 2 wherein said magnetic means comprise a plurality of blocks of high permeability high magnetic strength permanent magnetic materials, said studs are threadedly secured to said blocks of magnetic materials, and said resilient block constitutes a protective means for said blocks of magnetic materials whereby said magnets are protected against the compressive forces established between the surface contacting portion of said curved plate and the planar portion of said track plate.

4. A street plate for use with the endless tracks of a tractor where said endless tracks consist of a plurality of segmented track plates of paramagnetic materials, each of said track plates having a flat planar portion, a cleat portion extending normally outwardly from said planar portion for contacting the surface over which said tractor is being traversed, and a transverse row of bolt holes formed in said planar portion, said street plate comprising:
- a generally upwardly extending hollow portion having substantially vertical front and back walls, curved end walls, a flat top wall with a hook portion thereon extending outwardly from said vertical front wall for resting on the upper edge of said track plate cleat; and a generally flat planar base for contacting the upper surface of said track plate planar portion;
- a plurality of studs depending downwardly from said planar base for insertion into said track plate bolt holes; and
- magnetic fastening means resiliently secured to said top wall, depending downwardly inside said hollow portion and contacting the upper surface of said track plate planar portion.

5. A street plate as claimed in claim 4 wherein said magnetic means comprise an inverted U-shaped block of high permeability high magnetic strength permanent magnetic materials, said block having vertically depending legs from a horizontal yoke portion, the bottoms of said legs contacting the track plate planar portion, and the yoke portion having a central aperture for the passage of a headed screw threadedly received in a threaded hole in the top wall portion of said street plate and said resilient means comprise a compression spring surrounding the shank of said headed screw and interposed between the top of said magnetic yoke portion and the bottom surface of said top wall portion whereby said magnet is protected from the compressive forces set up between the surface contacting portion of said street plate top wall and the planar portion of said track plate.

6. Accessory traction units for use on the endless tracks of a tractor wherein said endless tracks consist of a plurality of segmented track plates of paramagnetic materials having a flat planar portion, a transverse cleat portion extending normally outward from said planar portion, and a transverse row of bolt holes formed in said planar portion, each traction unit comprising:
- a generally raised portion adapted to extend upwardly and outwardly from the said flat planar portion of said track plate, said raised portion being further adapted to extend above the outward edge of said cleat for preventing the roadway surface over which said tractor is moving and said cleat from making contact;
- a plurality of studs depending downwardly from said traction unit and adapted to fit into said track plate bolt holes;
- magnetic means carried by said traction unit adapted to be in contact with the upper surface of said flat planar portion of said track plate whereby said traction unit is detachably secured to said track plate; and
- resilient protective means interposed between the roadway surface contacting portion of said traction unit and said magnetic means for preventing said magnetic means from assuming the full compressive thrust developed between said roadway surface contacting portion of said traction unit and the flat planar portion of said track plate.

References Cited in the file of this patent

UNITED STATES PATENTS

| | | |
|---|---|---|
| 1,635,596 | White | July 12, 1957 |
| 2,922,933 | Mauer et al. | Jan. 26, 1960 |
| 2,967,737 | Moore | Jan. 10, 1961 |

FOREIGN PATENTS

| | | |
|---|---|---|
| 1,035,422 | France | Apr. 15, 1953 |